United States Patent
Bulte-Loyer et al.

(10) Patent No.: US 10,472,554 B2
(45) Date of Patent: Nov. 12, 2019

(54) METHODS FOR MAINTAINING ZONAL ISOLATION IN A SUBTERRANEAN WELL

(71) Applicant: SCHLUMBERGER TECHNOLOGY CORPORATION, Sugar Land, TX (US)

(72) Inventors: Helene Bulte-Loyer, Sceaux (FR); Loic Regnault de la Mothe, Le Chesnay (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/893,818

(22) PCT Filed: May 22, 2014

(86) PCT No.: PCT/EP2014/001381
§ 371 (c)(1),
(2) Date: Nov. 24, 2015

(87) PCT Pub. No.: WO2014/187566
PCT Pub. Date: Nov. 27, 2014

(65) Prior Publication Data
US 2016/0115365 A1    Apr. 28, 2016

(30) Foreign Application Priority Data
May 24, 2013   (EP) .................................... 13305674

(51) Int. Cl.
*E21B 33/13*   (2006.01)
*C09K 8/467*   (2006.01)
(Continued)

(52) U.S. Cl.
CPC .............. *C09K 8/467* (2013.01); *C04B 16/04* (2013.01); *C04B 26/02* (2013.01); *C04B 28/006* (2013.01);
(Continued)

(58) Field of Classification Search
None
See application file for complete search history.

(56) References Cited

U.S. PATENT DOCUMENTS 4,524,982 A    6/1985   Hertz, Jr.
10,125,302 B2 *  11/2018  Mishra .................... C04B 28/02
(Continued)

FOREIGN PATENT DOCUMENTS

EP    1533469 A1    5/2005
EP    2615151 A1    7/2013
(Continued)

OTHER PUBLICATIONS

Hertz, Jr. "Elastomers in the Hot Sour Gas Environment" Sep. 1986. Elastomerics.*
(Continued)

*Primary Examiner* — Angela M DiTrani Leff
(74) *Attorney, Agent, or Firm* — Andrea E. Tran

(57) ABSTRACT

A cement for use in wells in which hydrogen sulfide is present, comprises polymer particles. In the event of cement-matrix failure, or bonding failure between the cement/casing interface or the cement/borehole-wall interface, the polymer particles swell when contacted by hydrogen sulfide. The swelling seals voids in the cement matrix, or along the bonding interfaces, thereby restoring zonal isolation.

11 Claims, 3 Drawing Sheets

(51) Int. Cl.
*C04B 26/02* (2006.01)
*C04B 28/00* (2006.01)
*C04B 28/02* (2006.01)
*C04B 28/04* (2006.01)
*C04B 28/06* (2006.01)
*C04B 28/08* (2006.01)
*C04B 28/18* (2006.01)
*C04B 28/32* (2006.01)
*C04B 28/34* (2006.01)
*C04B 16/04* (2006.01)
*E21B 33/14* (2006.01)
*C04B 103/00* (2006.01)

(52) U.S. Cl.
CPC ............ *C04B 28/02* (2013.01); *C04B 28/021* (2013.01); *C04B 28/04* (2013.01); *C04B 28/06* (2013.01); *C04B 28/08* (2013.01); *C04B 28/18* (2013.01); *C04B 28/32* (2013.01); *C04B 28/34* (2013.01); *E21B 33/14* (2013.01); *C04B 2103/0028* (2013.01); *C04B 2103/0035* (2013.01); *C09K 2208/20* (2013.01); *Y02P 40/165* (2015.11); *Y02W 30/94* (2015.05)

(56) References Cited

U.S. PATENT DOCUMENTS

| | | | |
|---|---|---|---|
| 2007/0284108 A1 | 12/2007 | Roes et al. | |
| 2008/0023205 A1 | 1/2008 | Craster et al. | |
| 2009/0088348 A1 | 4/2009 | Roddy et al. | |
| 2010/0056403 A1 | 3/2010 | Abad et al. | |
| 2010/0175875 A1 | 7/2010 | Becker et al. | |
| 2011/0107848 A1* | 5/2011 | Le Roy-Delage | G01N 33/383 73/861.42 |
| 2011/0259587 A1 | 10/2011 | Joseph et al. | |
| 2012/0073814 A1 | 3/2012 | Algu et al. | |
| 2012/0205106 A1 | 8/2012 | Le Roy-Delage et al. | |
| 2014/0110114 A1* | 4/2014 | Daou | E21B 33/14 166/293 |
| 2017/0174977 A1 | 7/2017 | Bulte-Loyer | |

FOREIGN PATENT DOCUMENTS

| | | | |
|---|---|---|---|
| WO | 2004101951 A1 | 11/2004 | |
| WO | WO 2009/015725 * | 2/2009 | ............ C09K 8/467 |
| WO | 2011144433 A1 | 11/2011 | |
| WO | 2013092604 A1 | 6/2013 | |
| WO | 2014187566 A1 | 11/2014 | |

OTHER PUBLICATIONS

Scott, Willie. "Natural Gas from Oil Wells—Chemical Composition," Jan. 14, 2011, retrieved from http://www.brighthub.com/environment/science-environmental/articles/102923.aspx.*

International Search Report and Written Opinion issued in corresponding International Application No. PCT/EP2014/001381 dated Sep. 15, 2014.

Extended European Search Report issued in corresponding European Application No. 13305674.7 dated Oct. 22, 2013.

Moroni et al, "Zonal Isolation in Reservoir Containing CO2 and H2S", IADC/SPE 112703, Proceedings of IADC/SPE Drilling Conference, Mar. 4-6, 2008.

International Search Report and Written Opinion issued in corresponding International Application No. PCT/EP2014/001381 dated Sep. 15, 2014 (11 pages).

International Preliminary Report on Patentability issued in corresponding International Application No. PCT/EP2014/001381 dated Nov. 24, 2015.

Communication pursuant to Article 94(3) EPC issued in European Application No. 13305674.7 dated Oct. 30, 2015 (5 pages).

Communication pursuant to Article 94(3) EPC issued in European Application No. 13305674.7 dated May 4, 2016 (5 pages).

International Search Report and Written Opinion issued in corresponding International Application No. PCT/US2015/022757 dated Jul. 6, 2015 (9 pages).

Decision on Grant issued in Kazakhstan Patent Application No. 2015/1447.1 dated Mar. 9, 2017; 10 pages (with English translation).

Office Action issued in Russian Patent Application No. 2015155288 dated Feb. 6, 2017; 13 pages (with English translation).

Koveshnikov, Oil and Gas Geology, Tomsk Technical University, section 2.11, Composition and Properties of Gas, 2010—In Russian and with EnglishTranslation (9 pages).

* cited by examiner

METHODS FOR MAINTAINING ZONAL ISOLATION IN A SUBTERRANEAN WELL

BACKGROUND

This application claims priority to a U.S. National Stage Application of Patent Cooperation Treaty (PCT) of PCT/EP2014/001381, filed May 22, 2014, which claims priority to European Patent Application 13305674.7, filed May 24, 2013.

The statements in this section merely provide background information related to the present disclosure and may not constitute prior art.

This disclosure relates to compositions and methods for treating subterranean formations, in particular, compositions and methods for cementing and completing wells in which hydrogen sulfide is present.

During the construction of subterranean wells, it is common, during and after drilling, to place a tubular body in the wellbore. The tubular body may comprise drillpipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that the well penetrates. The latter function is important because it prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone.

The cement sheath achieves hydraulic isolation because of its low permeability. In addition, intimate bonding between the cement sheath and both the tubular body and borehole is necessary to prevent leaks. However, over time the cement sheath can deteriorate and become permeable. Alternatively, the bonding between the cement sheath and the tubular body or borehole may become compromised. The principal causes of deterioration and debonding include physical stresses associated with tectonic movements, temperature changes, pressure changes inside the casing and chemical deterioration of the cement.

Some oil and gas fields have formations whose fluids contain acid gases such as carbon dioxide and hydrogen sulfide. Such wells may be challenging from a zonal isolation point of view.

Oil and gas that contains elevated amounts of hydrogen sulfide are called "sour." It has been estimated that 15 to 25% of natural gas in the United States may contain hydrogen sulfide. Worldwide, the percentage could be as high as 30%. Hydrogen sulfide is a toxic substance; therefore, it is important to prevent it from escaping through the cement sheath into aquifers or to the surface. Furthermore, hydrogen sulfide is corrosive to steel, and maintaining a competent cement sheath is essential to prevent casing deterioration during the life of the well.

SUMMARY

The present disclosure presents improvements by describing compositions that form a sustainable cement sheath even in a hydrogen-sulfide environment, and methods by which they may be prepared and applied in subterranean wells.

In an aspect, embodiments relate to methods for maintaining zonal isolation in a subterranean well having a borehole in which hydrogen sulfide is present. A cement slurry, containing a material that swells when contacted by hydrogen sulfide, is pumped into the borehole. The cement slurry is allowed to set and harden. In the event of cement-matrix or bonding failure, the set cement is exposed to wellbore fluids that contain hydrogen sulfide. The material is allowed to swell, thereby restoring zonal isolation.

In a further aspect, embodiments relate to methods for cementing a subterranean well having a borehole in which hydrogen sulfide is present. A cement slurry, containing a material that swells when contacted by hydrogen sulfide, is pumped into the borehole. The cement slurry is allowed to set and harden. In the event of cement-matrix or bonding failure, the set cement is exposed to wellbore fluids that contain hydrogen sulfide. The material is allowed to swell, thereby restoring zonal isolation.

In yet a further aspect, embodiments relate to methods for completing a subterranean well having a borehole in which hydrogen sulfide is present. A cement slurry, containing a material that swells when contacted by hydrogen sulfide, is pumped into the borehole. The cement slurry is allowed to set and harden. In the event of cement-matrix or bonding failure, the set cement is exposed to wellbore fluids that contain hydrogen sulfide. The material is allowed to swell, thereby restoring zonal isolation.

In yet a further aspect, embodiments relate to methods for cementing or completing a subterranean well having a borehole. The borehole is tested, analyzed or otherwise determined to contain hydrogen sulfide or is likely to develop hydrogen sulfide in the future. A cement slurry, containing a material that swells when contacted by hydrogen sulfide, is pumped into the borehole. The cement slurry is allowed to set and harden. In the event of cement-matrix or bonding failure, the set cement is exposed to wellbore fluids that contain hydrogen sulfide. The material is allowed to swell, thereby restoring zonal isolation.

DETAILED DESCRIPTION

Figure 1:
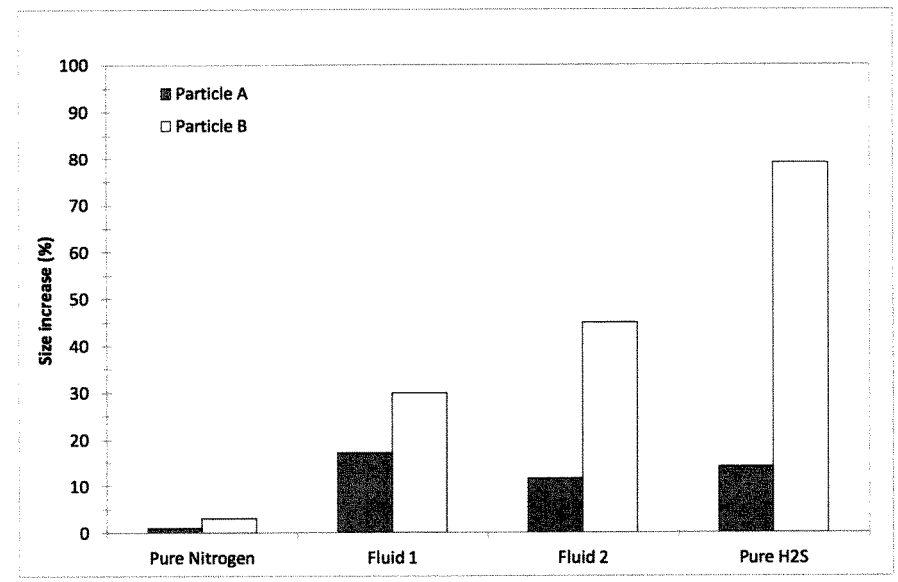
FIG. 1 shows the swelling behavior of polypropylene particles and natural rubber/styrene-butadiene particles in the presence of nitrogen, pure $H_2S$ and reservoir fluids containing $H_2S$.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that the Applicant appreciate and understands that any and all data points within the range are to be considered to have been specified, and that the Applicant possessed knowledge of the entire range and all points within the range.

Cement systems that form durable cement sheath in an environment containing hydrogen sulfide would be positively received by the industry. The Applicant has determined that cement compositions comprising materials that swell in the presence of hydrogen sulfide would respond to the industry challenges. When incorporated into a cement composition, such hydrogen sulfide swelling compounds may enable the cement sheath to close its own voids and/or cracks that may appear.

The Applicant has determined that certain polymers may fulfill the required swellable capacity in the presence of hydrogen sulfide. Such polymers may comprise natural rubber, nitrile rubber, styrene-butadiene rubber, polymers or copolymers comprising ethylene and/or propylene, butyl (isobutene-isoprene) rubber, hydrogenated nitrile butadiene rubber, acrylonitrile-butadiene copolymer, or combinations thereof. In some embodiments, such polymers comprise polypropylene, a blend of natural rubber and styrene-butadiene rubber or a combination thereof. In some embodiments, such polymers are polypropylene. In some embodiments, such polymers are a blend of natural rubber and styrene-butadiene rubber.

In an aspect, embodiments relate to methods for maintaining zonal isolation in a subterranean well having a borehole, in which hydrogen sulfide is present. A cement slurry, containing a material that swells when contacted by hydrogen sulfide, is pumped into the borehole. The cement slurry is allowed to set and harden. In the event of cement-matrix or bonding failure, the set cement is exposed to wellbore fluids that contain hydrogen sulfide. The material is allowed to swell, thereby restoring zonal isolation.

In a further aspect, embodiments relate to methods for cementing a subterranean well having a borehole, in which hydrogen sulfide is present. A cement slurry, containing a material that swells when contacted by hydrogen sulfide, is pumped into the borehole. The cement slurry is allowed to set and harden. In the event of cement-matrix or bonding failure, the set cement is exposed to wellbore fluids that contain hydrogen sulfide. The material is allowed to swell, thereby restoring zonal isolation.

In yet a further aspect, embodiments relate to methods for completing a subterranean well having a borehole, in which hydrogen sulfide is present. A cement slurry, containing a material that swells when contacted by hydrogen sulfide, is pumped into the borehole. The cement slurry is allowed to set and harden. In the event of cement-matrix or bonding failure, the set cement is exposed to wellbore fluids that contain hydrogen sulfide. The material is allowed to swell, thereby restoring zonal isolation.

In yet a further aspect, embodiments relate to methods for cementing or completing a subterranean well having a borehole. The borehole is tested, analyzed or otherwise determined to contain hydrogen sulfide or is likely to develop hydrogen sulfide in the future. A cement slurry, containing a material that swells when contacted by hydrogen sulfide, is pumped into the borehole. The cement slurry is allowed to set and harden. In the event of cement-matrix or bonding failure, the set cement is exposed to wellbore fluids that contain hydrogen sulfide. The material is allowed to swell, thereby restoring zonal isolation.

For all aspects, the borehole penetrates at least one fluid-containing reservoir, the reservoir containing fluid with a hydrogen sulfide concentration greater than about 5 moles per liter of fluid. The hydrogen sulfide may be supercritical, wet, dry or dissolved in oil or water. Hydrogen sulfide may also be liberated from the dissociation (aquathermolysis) of asphaltic or heavy hydrocarbons in the presence of steam in thermal recovery wells. Such heavy crude oils may contain organic sulfides (R—S—R'), polysulfides (R—$S_x$—R'), thiofenes and thiols (R—S—H). Therefore, the present disclosure is appliable to wells in which the steam assisted gravity drainage (SAGD) or cyclic steam stimulation (CSS) processes are employed. For CSS, applications, the swellable material may be a thermoset or thermoplastic material with a melting point higher than the steam injection temperature.

For all aspects, the material may comprise natural rubber, nitrile rubber, styrene-butadiene rubber, polymers or copolymers comprising ethylene, propylene, or both, butyl (isobutene-isoprene) rubber, hydrogenated nitrile butadiene rubber, acrylonitrile-butadiene copolymer, or combinations thereof. Such polymers may comprise polypropylene, a blend of nitrile rubber and styrene-butadiene rubber or a combination thereof. In some embodiments, such polymers are polypropylene. In some embodiments, such polymers are a blend of natural rubber and styrene-butadiene rubber. The concentration of the material may be between about 5% and 50% by volume of solids in the cement slurry, also known as "by volume of blend (BVOB)." Or the range may be between about 10% and 40% BVOB. For optimal performance, the particle-size distribution of the material may be such that the average particle size is between about 10 µm and about 1000 µm. The average particle size may also be between about 100 µm and 900 µm.

Persons skilled in the art will recognize that the present use of polymers is different and distinct from their use as cement extenders (i.e., to reduce the amount of cement or to reduce the cement-slurry density) or as materials to improve cement flexibility.

The polymers may have Young's moduli between about 1 and 4000 MPa, or the polymers may have Young's moduli between about 1 and 2000 MPa. The Poisson's ratio of the polymers may be higher than 0.4, or Poisson's ratio of the polymers may be higher than 0.45.

For all aspects, the cement may additionally comprise one or more members of the list comprising Portland cement, calcium aluminate cement, fly ash, blast furnace slag, lime-silica blends, zeolites, geopolymers, Sorel cements, chemically bonded phosphate ceramics, polymer resins and mixtures thereof. The polymer resins may comprise epoxy resins, furan resins, phenolic resins and combinations thereof. The composition shall be pumpable. Those skilled in the art will recognize that a pumpable fluid in the context of well cementing has a viscosity lower than about 1000 mPa-s at a shear rate of 100 s$^{-1}$ at the temperatures to which the fluid is exposed during a cementing operation, and during the time necessary to place the composition in the well. Also, the tubular body may comprise one or more members of the list comprising drillpipe, casing, liner and coiled tubing. In addition, the borehole may penetrate at least one fluid-containing reservoir, the reservoir preferably containing fluid with a hydrogen sulfide concentration greater than about five moles per liter.

The cement slurry may further comprise dispersing agents, fluid-loss-control agents, set retarders, set accelerators, foaming agents, gas generating agents, antifoaming agents, extenders, weighting agents, lost-circulation control agents, flexible particles, self-healing additives and combinations thereof Other compounds may also be present such as coal, petroleum coke, graphite or gilsonite and mixtures thereof. Further, the hydrogen sulfide swellable polymers may be coupled to water super absorbent polymers such as polymethacrylate, polyacrylamide and non-soluble acrylic polymers. A further association may be with one or more compounds from the list comprising an aqueous inverse emulsion of polymer comprising a betaine group, poly-2, 2, 1-bicyclo heptene (polynorbornene), alkylstyrene, cross-linked substituted vinyl acrylate copolymers, diatomaceous earth, vulcanized rubber, polyisoprene rubber, vinyl acetate rubber, polychloroprene rubber, acrylonitrile butadiene rubber, hydrogenated acrylonitrile butadiene rubber, ethylene propylene diene monomer, ethylene propylene monomer rubber, styrene-butadiene rubber, styrene/propylene/diene monomer, brominated poly(isobutylene-co-4-methylstyrene), butyl rubber, chlorosulphonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulphonated polyethylene, fluoro silicone rubbers, fluoroelastomers, substituted styrene acrylate copolymers and bivalent cationic compounds or any other particles such as those described in US Patent Application No. 2007/0137528 that swell when exposed to liquid hydrocarbons, the application being incorporated herein by reference in its entirety. Further combinations may be made with thermoplastic block polymers including for example styrene-isoprene-styrene (SIS), styrene-butadiene-styrene (SBS) and mixtures thereof.

The cement slurry may further comprise materials that swell in the presence of another acid gas. The materials may be an elastomer comprising chlorofluorocarbons, tetrafluoroethylene-propylene copolymers, ethylene-propylene copolymers, isobutene-isoprene rubbers, nitrile rubbers, hydrogenated nitrile butadiene rubbers, or tetrafluoroethylene-perfluorovinyl methyl ether copolymers and combinations thereof.

Persons skilled in the art will recognize that these methods may be performed during a primary cementing operation or a remedial cementing operation. The primary cementing operation comprises the installation of a tubular body inside the borehole of a well, or inside a tubular body. The pumping of the cement slurry may be performed the traditional way (i.e., the slurry is pumped down the casing and up the annulus) or by "reverse cementing," which consists of pumping the slurry down the annulus. Remedial cementing techniques for which the disclosed cement slurries may be applicable include plug cementing and squeeze cementing.

EXAMPLES

The following examples serve to further illustrate the disclosure. During the disclosed experiments, polymer particles were exposed to various types of fluids. The fluids were nitrogen, pure $H_2S$ and three reservoir fluids (Fluids 1, 2 and 3). The reservoir-fluid compositions are given in Table 1.

TABLE 1

Compositions of Reservoir Fluids Employed in Particle Swelling Tests

|  | Fluid 1 | Fluid 2 | Fluid 3 |
|---|---|---|---|
|  | Component (mol %) | | |
| $CO_2$ | 4 | 4.954 | 4.94 |
| $H_2S$ | 15 | 17.983 | 0 |
| $N_2$ | 0.8 | 0.978 | 18.76 |
| $C_1$ | 47.5 | 56.467 | 56.67 |
| $C_2$ | 7.4 | 8.778 | 8.60 |
| $C_3$ | 4.1 | 4.893 | 4.88 |
| $i-C_4$ | 0.9 | 1.027 | 1.04 |
| $n-C_4$ | 2.1 | 2.336 | 2.48 |
| $i-C_5$ | 0.9 | 0.912 | 0.90 |
| $n-C_5$ | 1.1 | 0.87 | 0.88 |
| $C_6$ | 1.3 | 0.803 | 0.85 |
| $C_7$ | 1.5 | 0 | 0 |
| Toluene | 0.2 | 0 | 0 |
| $C_8$ | 1.7 | 0 | 0 |
| m&p-Xylene | 0.25 | 0 | 0 |
| o-Xylene | 0.125 | 0 | 0 |
| $C_9$ | 1.3 | 0 | 0 |
| $C_{10}$ | 9.825 | 0 | 0 |
| Total | 100 | 100.001 | 99.94 |

Example 1

Polymer particles were placed inside a pressure cell equipped with a window that allows one to observe the behavior of materials within the cell. The cell supplier is Temco Inc., located in Houston, Tex. USA. The cell temperature is also adjustable. A camera captures images from inside the pressure cell, and image-analysis software is employed to interpret the behavior of materials inside the cell. After the polymer particles were introduced into the cell, the cell was sealed. Various types of fluids were introduced into the cell, and the camera recorded size changes of the particles when exposed to 60° C. (140° F.) and 34.5 MPa (5000 psi) for 360 min.

Two types of particles were tested: polypropylene (Particle A) and a blend of natural rubber and styrene-butadiene rubber (Particle B). The particles were exposed to four different test fluids: nitrogen, pure $H_2S$, and two reservoir fluids (Fluids 1 and 2) that contained $H_2S$. Their compositions are given in Table 1. Fluid 1 was liquid and Fluid 2 was gaseous under the test conditions.

The results, shown in FIG. 1, indicate that both particles swell significantly in the presence of $H_2S$, while swelling is minimal in the presence of nitrogen.

Example 2

The following example demonstrates the ability of $H_2S$ swellable particles embedded in a cement matrix to stop the flow of $H_2S$ through cracks or microannuli.

Figure 2:
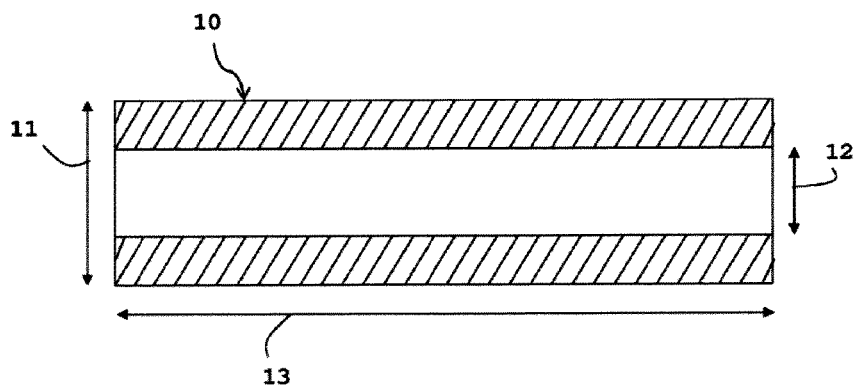
FIG. 2 is a section view of a test cell for the implementation of the test described in Example 2.
Figure 3:
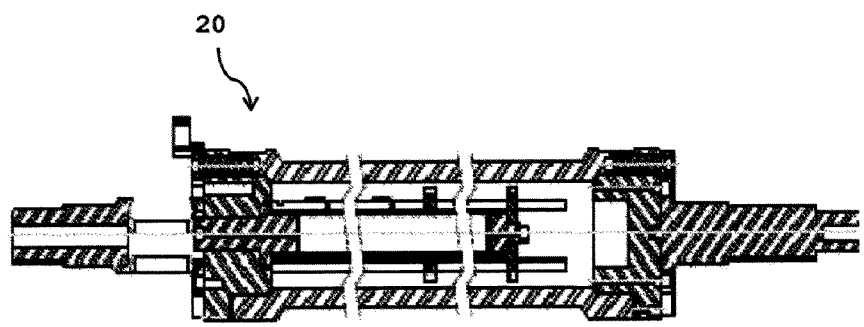
FIG. 3 is a section view of a core holder placed in the test cell.

Experiments were performed in a sample test cell. As shown in FIG. 2, the test cell 10 is made of stainless steel and is substantially cylindrical. The outside diameter 11 of the cylinder is 38.1 mm, its inside diameter 12 is 21.2 mm and its length 13 is 180 mm. Test cement specimens are fabricated to fit inside the test cell. The test cell is positioned inside a core holder 20, shown in FIG. 3. The core holder is a core flood system based on a Hassler sleeve that uses samples of 38.1-mm diameter. Such sleeves are well known in the art. Two volumetric pumps with a combined capacity of 32 mL/min deliver test fluids to the cell. A back-pressure regulator maintains a constant pressure at the outlet face of the cement sample.

The first cement composition was Class G cement+10% BVOB Particle A+45% BVOB silica+10% BVOB microsilica+1% by weight of blend (BWOB) magnesium oxide+2 L/tonne polyglycol antifoam agent+1.3% BWOB polynaphthalene sulfonate dispersant+0.65% BWOC lignosulfonate retarder+85 L/tonne latex fluid-loss additive. Sufficient water was added to achieve a slurry density of 1950 kg/m$^3$.

Figure 4:
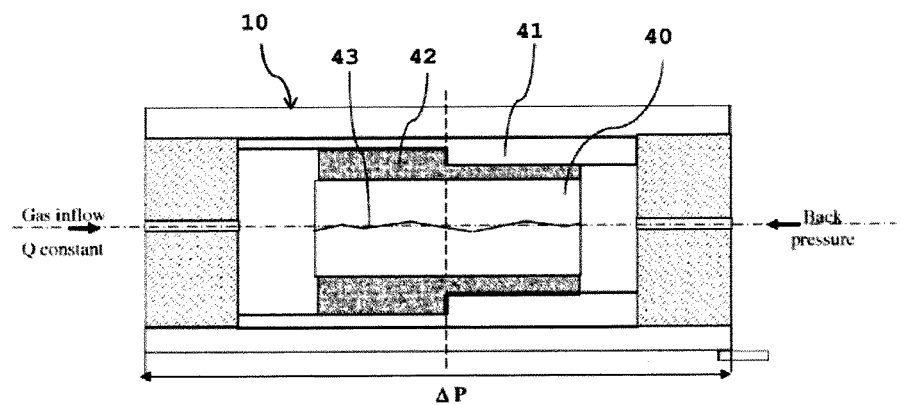
FIG. 4 is a section view of a test cell provided with a sample of set cement wherein a crack has been created parallel to the axis of the core by fracturing in tension.

As shown in FIG. 4 cylindrical set-cement sample 40 was prepared and damaged such that cracks 43 extended along its longitudinal axis. The test cell 10 contained the cement sample in a thick metallic cylinder 41. The core was held in place by surrounding sleeve 42.

Figure 5:
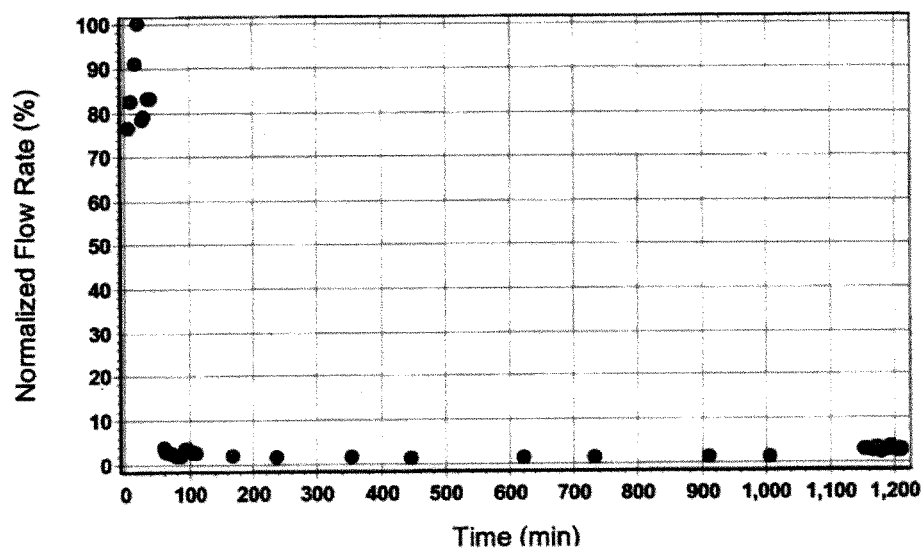
FIG. 5 shows the ability of a cracked cement core containing polypropylene particles to reduce the flow of an invading gaseous reservoir fluid containing $H_2S$.

Fluid 2, described in Table 1, was pumped into the test cell at 8 mL/min. The cell conditions were 60° C. and 34.5 MPa. The results, shown in FIG. 5, demonstrate that the cement sample self-healed within about 50 minutes exposure to the flowing Fluid 2. The normalized flow rate through the cell fell by 97%. The experiment was repeated with Fluid 3, described in Table 1. Fluid 3 was gaseous at the cell conditions. Note that Fluid 3 does not contain H$_2$S. This time, the normalized flow rate through the cell increased by 10%.

The second cement composition was Class G cement+10% BVOB Particle B+35% BVOB silica+10% BVOB microsilica+1% by weight of blend (BWOB) magnesium oxide+6 L/tonne polyglycol antifoam agent+0.5% BWOB polynaphthalene sulfonate dispersant+0.57% BWOC lignosulfonate retarder+85 L/tonne latex fluid-loss additive. Sufficient water was added to achieve a slurry density of 1950 kg/m$^3$.

Fluid 2 was pumped through the sample as described above at 16 mL/min. The normalized flow rate through the cell fell by 82%. The experiment was repeated with Fluid 3. This time, the normalized flow rate through the cell decreased by 5%.

The results show that the presence of H$_2$S in the reservoir fluids was necessary for the polymer particles to provide adequate flow reduction.

Although various embodiments have been described with respect to enabling disclosures, it is to be understood that the preceding information is not limited to the disclosed embodiments. Variations and modifications that would occur to one of skill in the art upon reading the specification are also within the scope of the disclosure, which is defined in the appended claims.

The invention claimed is:

1. A method for maintaining zonal isolation in a subterranean well having a borehole in which hydrogen sulfide is present, comprising:
    (i) pumping a cement slurry comprising a material that swells when contacted by hydrogen sulfide into the borehole; and
    (ii) allowing the cement slurry to set and harden to form a cement matrix,
    wherein, upon exposure to wellbore fluids containing hydrogen sulfide at a concentration higher than about five moles per liter, a normalized flow rate reduction of at least 97 percent takes place through the cement matrix,
    wherein the material consists of polypropylene.

2. The method of claim 1, wherein the material is present in the cement slurry at a concentration between about 5 percent and about 50 percent by volume of solid blend.

3. The method of claim 1, wherein the material has an average particle size between about 10 µm and about 1000 µm.

4. The method of claim 1, wherein the hydrogen sulfide is supercritical, wet, dry or dissolved in oil or water.

5. The method of claim 1, wherein the cement slurry comprises one or more members selected from the list consisting of Portland cement, calcium aluminate cement, fly ash, blast furnace slag, lime-silica blends, zeolites, geopolymers, Sorel cements, chemically bonded phosphate ceramics and polymer resins.

6. The method of claim 1, wherein a tubular body is installed in the borehole, the tubular body comprising one or more members selected from the list consisting of drillpipe, casing, liner and coiled tubing.

7. A method for cementing a subterranean well having a borehole in which hydrogen sulfide is present, comprising:
    (i) pumping an aqueous cement slurry into the borehole, the cement slurry comprising a material that swells when contacted by hydrogen sulfide; and
    (ii) allowing the cement slurry to set and harden to form a cement matrix,
    wherein, upon exposure to wellbore fluids containing hydrogen sulfide at a concentration higher than about five moles per liter, a normalized flow rate reduction of at least 97 percent takes place through the cement matrix,
    wherein the material consists of polypropylene.

8. The method of claim 7, wherein the material is present in the cement slurry at a concentration between about 5 percent and about 50 percent by volume of solid blend.

9. The method of claim 7, wherein the material has an average particle size between about 10 µm and about 1000 µm.

10. The method of claim 7, wherein the hydrogen sulfide is supercritical, wet, dry or dissolved in oil or water.

11. The method of claim 7, wherein the cement comprises one or more members of the list comprising Portland cement, calcium aluminate cement, fly ash, blast furnace slag, lime-silica blends, zeolites, geopolymers, Sorel cements, chemically bonded phosphate ceramics and polymer resins.

* * * * *